July 14, 1964  E. STEINGROEVER  3,141,102
ADJUSTABLE DOUBLE PATH BRAKE MAGNET
Filed Sept. 1, 1960
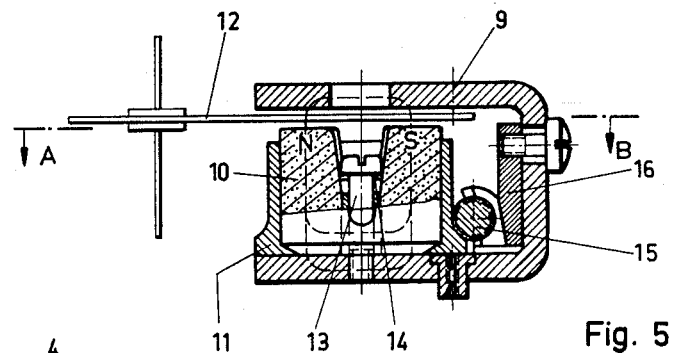
Fig. 5
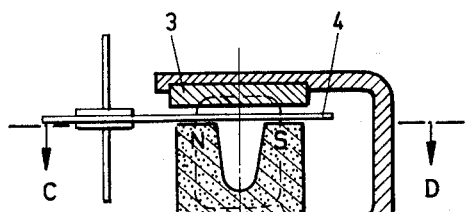
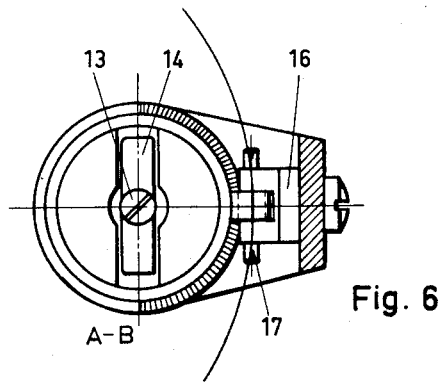
Fig. 6
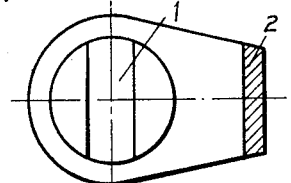
Fig. 1
Fig. 2
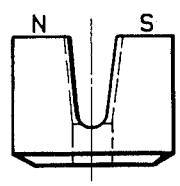
Fig. 7
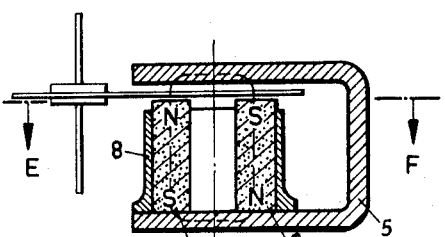
Fig. 3
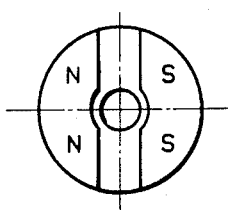
Fig. 8
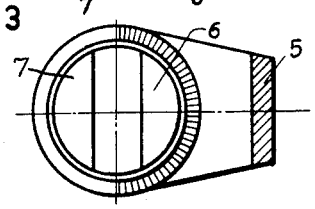
Fig. 4
INVENTOR.
BY United States Patent Office 3,141,102
Patented July 14, 1964

3,141,102
ADJUSTABLE DOUBLE PATH BRAKE MAGNET
Erich Steingroever, Bonn, Germany, assignor to Magnetfabrik Bonn Gewerkschaft Windhorst, Bonn, Germany
Filed Sept. 1, 1960, Ser. No. 53,547
4 Claims. (Cl. 310—93)

The invention relates to adjustable double path brake magnet systems suitable for electrical current meters, scales, and other systems containing parts to be braked during their movement; it relates particularly to a brake magnet system with permanent magnets, the two poles of which face a braking eddy current conductor, on the other side of which there is arranged a fixed soft iron return path so that the regulation of the brake force, while maintaining a constant air gap length, may be effected through the rotation of the magnet around its symmetry axis.

As the known brake magnet systems require a relatively large installation space, it is a principal object of this invention to provide a magnet system of considerably smaller dimension in order to render such system better adapted to application in many fields. According to the invention, I obtain a particularly space-saving construction of a magnet system of this type by arranging a U-shaped single or multiple part permanent magnet inside a bracket, in such a manner that the back of the magnet lies along the inner wall of the bracket.

The invention will be described more in detail with reference to the accompanying drawings in which FIG. 1 is an elevational view of a brake system according to the invention;

FIG. 2 is a sectional view along line C—D of FIG. 1;

FIG. 3 is an elevational view similar to FIG. 1 of another embodiment of the invention, and FIG. 4 is a sectional view taken along line E—F of FIG. 3;

FIG. 5 is an elevational view of still another modification, illustrating the rotatable arrangement of the permanent magnet, and FIG. 6 is a sectional view along line A—B of FIG. 5;

FIGS. 7 and 8 show the permanent magnet of the device shown in FIGS. 5 and 6.

Referring first to the embodiment of the invention shown in FIGS. 1 and 2, the reference numeral 1 designates a U-shaped permanent magnet with poles N and S; 2 is a stirrup-line support of non-magnetic material, for example, a light metal or zinc, and 3 is a fixed soft iron magnetic flux return plate.

The permanent magnet creates the magnetic flux shown in dotted lines, which passes twice through the air space. In the air space there extends a braking disc 4 of good electric conductivity, on which act the various brake torques of the permanent magnet which is rotatable around its center axis, whereby said torques depend on the position of the magnet's poles.

In the embodiment of the invention shown in FIGS. 3 and 4, the supporting bracket 5 itself is made of soft iron, so that the magnetic flux may pass to it from the poles of the magnet system. The magnet system consists of two identical cylinder segments 6 and 7, which are joined together by non-magnetic means 8, for example, by means of sprayed metal. At the back of the magnet system, the segments are in magnetic contact with the soft iron mounting, so that the magnetic flux may pass unhindered therethrough. The segments are displaceably, that is rotatably around the center axis, mounted on the support 5 in order to allow adjustment of the brake torque.

A particularly advantageous embodiment of the invention is shown in FIGS. 5 and 6. In these figures, 9 is a U-shaped holder of soft iron, 10 is a U-shaped permanent magnet with poles N and S, which is arranged in a non-magnetic support 11 and is rotatable about its central axis. Its magnetic flux passes through the air space and the brake plate 12 at two places; at the back, the flux passes partly through the iron of the holder 9, so that a particularly small height of the system is achieved. For the sake of clarity, the permanent magnet is shown again in FIGS. 7 and 8. The magnet is of cylindrical construction and derives its U-shape from a deep cross cut. The magnet is provided with a central bore, so that it may be rotatably secured.

In FIGS. 5 and 6, there is further illustrated an advantageous type of a rotatable means for securing the permanent magnet in the return path bracket. The screw 13 centers and thereby holds the magnet by means of spring 14 on the inner wall of the bracket. The worm screw 15 is mounted in a screw mounting 16 which is secured to the bracket by means of a screw, and is in engagement with a corresponding toothing of the magnet casing 11, so that said casing and the magnet itself may be very delicately rotated. A slot 17 is provided in the worm screw for its manipulation. Suitable material for the brake magnet system according to the invention are, in particular, the known magnetic iron-nickel-aluminum-cobalt alloys as well as ceramic compositions of the type $BaO \cdot 6Fe_2O_3$. The latter permit a particularly low design, but require a proportionately larger compensation of the temperature coefficient of the magnetization. This may advantageously be built into the slot of the U-shaped permanent magnet in the form of an alloy strip or wire with a negative magnetic temperature coefficient.

I claim:

1. An adjustable double path brake magnet comprising a housing of soft iron material, a cylindrical permanent magnet member U-shaped to form a pair of spaced poles of opposite polarity, said magnet being mounted interiorly of said housing on one side thereof, the opposite side of said housing being spaced from said poles and serving as a return path for the magnetic flux, an electrically conductive braking element extending between said poles and said opposite side of the housing and spaced therefrom, screw means located between the legs of the U-shaped magnet member rotatably securing said member to said housing, and an aperture in said opposite side of the housing opposite the air gap between said spaced poles, said aperture allowing access to said screw means.

2. The device according to claim 1, further provided with adjusting means for rotating said magnet member to a desired position.

3. The device according to claim 1, wherein said magnet member is provided with pivot means of adjustable tension.

4. The device according to claim 2 comprising a rotatable non-magnetic support for said magnet member in operative engagement with said adjusting means.

References Cited in the file of this patent

UNITED STATES PATENTS 2,605,301    Barnes _____ July 29, 1952

FOREIGN PATENTS 288,474    Switzerland _____ May 16, 1953
536,707    Great Britain _____ May 23, 1941
662,476    Great Britain _____ Dec. 5, 1951
690,923    Great Britain _____ Apr. 29, 1953
856,765    Germany _____ Nov. 24, 1952